(12) United States Patent
Barthel et al.

(10) Patent No.: US 8,982,669 B2
(45) Date of Patent: Mar. 17, 2015

(54) METHOD FOR DETECTING OBJECTS

(75) Inventors: Paul Barthel, Dresden (DE); Lorenz Hagenmeyer, Ostfildern (DE); Martin Mueller, Stuttgart-Bad Cannstatt (DE); Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 13/510,779

(22) PCT Filed: Nov. 16, 2010

(86) PCT No.: PCT/EP2010/067547
§ 371 (c)(1),
(2), (4) Date: Jul. 31, 2012

(87) PCT Pub. No.: WO2011/061173
PCT Pub. Date: May 26, 2011

(65) Prior Publication Data
US 2012/0293356 A1     Nov. 22, 2012

(30) Foreign Application Priority Data
Nov. 23, 2009   (DE) .................. 10 2009 047 012

(51) Int. Cl.
*G01S 13/04* (2006.01)
*G01S 15/04* (2006.01)
*G01S 7/41* (2006.01)
*G01S 7/539* (2006.01)

(52) U.S. Cl.
CPC ............... *G01S 7/412* (2013.01); *G01S 7/539* (2013.01); *G01S 7/417* (2013.01)
USPC ............................................. 367/99

(58) Field of Classification Search
CPC ........... G01S 7/412; G01S 7/539; G01S 7/417
USPC ................................... 367/99, 105, 93; 342/27
See application file for complete search history.

(56) References Cited

U.S. PATENT DOCUMENTS

| 4,603,331 | A | | 7/1986 | Wehner | |
| 4,800,541 | A | * | 1/1989 | Farmer et al. | 367/118 |
| 6,449,215 | B1 | | 9/2002 | Shell | |
| 6,801,474 | B2 | * | 10/2004 | Preston | 367/88 |
| 2007/0201309 | A1 | | 8/2007 | Brown et al. | |
| 2008/0205194 | A1 | | 8/2008 | Chiappetta et al. | |
| 2009/0122642 | A1 | | 5/2009 | Komatsu et al. | |
| 2012/0293356 | A1 | * | 11/2012 | Barthel et al. | 342/27 |

FOREIGN PATENT DOCUMENTS

| CN | 102713667 A | * | 10/2012 |
| DE | 198 14 776 | | 10/1999 |

(Continued)

OTHER PUBLICATIONS

International Search Report for PCT/EP2010/067547, dated Mar. 3, 2011.

*Primary Examiner* — Daniel Pihulic
(74) *Attorney, Agent, or Firm* — Kenyon & Kenyon LLP

(57) ABSTRACT

In a method for detecting objects, at least one sensor emits a transmitting pulse as a wave, particularly as an acoustic or an electromagnetic wave, which wave is reflected at least partially by objects in the propagation space, and the reflected wave being detected by at least one receiver as a received signal. The received signal of the reflected wave is divided up into segments, and from the individual segments, data are gathered that are drawn upon for the determination of an object hypothesis.

17 Claims, 2 Drawing Sheets

(56) References Cited

FOREIGN PATENT DOCUMENTS

| DE | 10 2007 024 641 | | 2/2008 |
| DE | 102009047012 | A1 * | 5/2011 |
| EP | 2504718 | A1 * | 10/2012 |
| WO | WO 2011061173 | A1 * | 5/2011 |

* cited by examiner

METHOD FOR DETECTING OBJECTS

BACKGROUND OF THE INVENTION

1. Field of the Invention

The present invention relates to a device and a method for detecting objects, at least one transmitter emitting a transmitting pulse as a wave, which is reflected at least partially by objects in the propagation space; the reflected wave being detected by at least one receiver as a received signal.

2. Description of Related Art

From published German patent application document DE 10 2007 024 641 A1 it is known that sensor data from a plurality of different sensor signal currents detected for a measuring space are drawn upon to form object hypotheses. In this context, any objects, particularly movable objects, such as animals and persons, are detected. However, these signal currents have to be comprehensively evaluated and weighted, which calls for a high technical effort.

BRIEF SUMMARY OF THE INVENTION

It is the objective of the present invention to provide a method and a device for forming object hypotheses with the aid of a received signal by at least one receiver, the method and the device being designed simply and reliably in measurement technology, which makes possible a rapid and accurate analysis for forming object hypotheses.

According to the present invention it is provided that the received signal of the reflected wave be divided up into segments, and from the individual segments, additional data being gathered that are drawn upon for the determination of an object hypothesis. Because of this, a simple and rapid processing of the individual segments is made possible, and in addition, the parallel processing of the individual segments may be taken into consideration.

It is of particular advantage that the individual segments are subdivided over time. A subdivision over time of the received signal, in this instance, is conceivable into equally long and/or unequally long segments. Because of that, the received signal of the reflected wave may be extracted in firmly defined partial signals, so that investigation of the partial, signals is made easier. In addition, observation of significant features of the received signal is possible. Furthermore, the possibility opens up of dropping partial signals, that have no high information content, without obtaining a substantial reduction in the overall information of the received signal. Because of that, efficient and rapid processing and investigation of the received signal disassembled into partial signals may be ensured. It is additionally conceivable that the signal curve of the received signal is subdivided into individual segments. Thus, data may be ascertained over a certain time interval within a specified boundary region, which permit additional evidence on the information content of the received signal. In addition, the specified boundary region may also be limited in time, so that, in the near region of an amplitude, the displacement of the received signal may be investigated more accurately. In addition, the received signal may be subdivided into two-dimensional areas of any size, by subdividing the abscissa and the ordinate into any boundary regions, so that the received signal is able to be disassembled into partial pieces of any size that are able to be drawn upon for closer investigation on their information content. In order to obtain particularly usable received signals of objects that are at a distance of more than 10 m from the receiver, one may advantageously use electromagnetic transmitters for the emission of transmitting pulses. For distances of objects below 10 m, ultrasonic waves have proven to be especially expedient.

Moreover, it is advantageous that a curve adjustment takes place for the envelope of the amplitude over the individual segments over time. Because of that, the individual segments are able to be characterized, since essential features are detected via the envelope of the amplitude. For the determination of the envelope, a Gaussian fit function may be called upon. This particularly offers the advantage that the use of the Gaussian fit function is able to be carried out by a model-based design software, such as Matlab, for the rapid and sure calculation of the envelope, since this function is already made available in one of the libraries of the application software.

Furthermore, it has proven advantageous that data are ascertained for the decay behavior of the received signal. These data indirectly reflect the interaction of the sound wave with the object to be detected, and may also be used to characterize the object. The decay behavior also makes possible a comprehensive investigation of the received signal, so that unique features may be filtered out. Thus, the decay behavior of the most varied objects, such as smooth and rough walls, guardrails, roadway posts, curbstones, parking space boundaries and the like are picked up. The decay behavior of these objects may then be stored in a data bank, which may then be drawn upon for the further classification of the objects.

It is particularly advantageous that pulse features are ascertained via the half-height width and/or the actual pulse height from the individual segments over time of the received signal. For objects which generally have in their makeup edges, corners, roundings and roughnesses, there is an increase in the scattering proportion/diffraction proportion, which as a rule becomes noticeable in an enlargement of the half-height width. Thus, a smooth surface, for instance, leads to slight scattered data, and a received signal is only able to be perceived if the normal to the surface of the object is orthogonal to the sensor. Object size also has an effect on the intensity of the detected signal. Moreover, the information concerning the actual pulse height is used as an additional feature for the phenomenological classification of objects. Thus, for all detected information features of a received signal, the observed extracted features are observed for each segment over time, and a classification is able to be carried out accordingly.

It is also particularly advantageous that the data of the individual segments over time and of the received signal are drawn upon for the formation of an object hypothesis, which particularly give information on the type and/or the surface properties and/or the type of the object. Since the information content of the segments over time is ascertained by investigations of the curve adjustment for the envelope of the amplitude and/or via the half-height width and/or the actual pulse height, the shape of a segment over time is able to give information on the geometry and the surface character of an object. In addition, together with the information over time on the decay behavior of the received signal, the possibility is thus created of identifying the object more accurately. Consequently, these data indirectly reflect the interaction of a sound wave with the objects, and may be used for the certain characterization of the objects.

Furthermore, it is conceivable that, using an iterative and model-based approach and/or via the data of stored reflection signals from a data bank, a parametric or nonparametric classification method, such as neural networks, support vector machines, Gaussian processes or additional methods of machine learning and soft computing, the formation of an object hypothesis will be made possible. It is also conceivable that training signals are picked up from objects, with the aid of which an adaptive system for classification is designed. Thus, training signals may be from typical objects, such as smooth and rough walls, guardrails, roadway posts, curbstones, parking space boundaries and the like. From these objects, based on the pulse features, classificators may be trained that are stored on a control unit that is used in a motor vehicle. In addition, these classificators may be drawn upon for an evaluation in the signal analysis. Moreover, the training signals, together with the segments over time, may be supplied to an artificial neural network, so that the formation of an object hypothesis is made easier. Because of this, a small number of picked up training signals, which are used as input for a parametric or nonparametric classification method, may already lead to a certain formation of an object hypothesis. Thereby an adaptive system in the form of a neural network and or a data bank may also be set up.

Furthermore, it has proven to be advantageous that, using a supplementary sensor system, such as a video scanner and/or laser scanner, additional signals and/or data of digital maps may be drawn upon for setting up a three-dimensional environmental model. The data obtained for the object hypothesis, connected with the additional signals of a supplementary sensor system and/or using data of digital maps make it possible to set up an initial three-dimensional environmental model. One might also imagine that GPS or navigational data would be drawn upon for setting up the initial three-dimensional environmental model.

Moreover, it may be provided that a determination, particularly also a computation of the deviation of the object hypothesis from the three-dimensional environmental model is undertaken. This initial three-dimensional environmental model may be the starting point for an iterative adaptation of an environmental configuration, the aim being to derive a stable model hypothesis. To do this, for the ascertained three-dimensional environmental configuration, the sound propagation of a transmitted signal may be calculated online using a ray tracing method, and the physical interaction (diffraction, refraction, scattering, reflection) may be shown. The physical object parameters required are able to be taken from a library of standard models. Additional steps may be carried out by a comparison of computed signals to an ascertained received signal, in order thus to obtain a deviation from reality. As long as a specified tolerance threshold is exceeded, one may assume that the three-dimensional environmental model does not yet sufficiently accurately reflect reality. Therefore, directed adaptations of the three-dimensional environmental model may be carried out, and the steps described before may be run through until a specified breaking-off condition is satisfied. The three-dimensional environmental model is thus a robust reflection of the real environment, and may thus be passed on, for example, to a post-connected driver assistance function in a motor vehicle. It is also particularly advantageous that, because of the method, the detection of dynamic objects becomes possible. Thus, from available vehicle and sensor positions and data on static three-dimensional objects, the received signals to be expected may be precalculated from digital maps. Strong deviations should, in first place, be attributed to dynamic objects, whose classification may be carried out more rapidly by the delimitation of the hypothesis space described, and, particularly for ultrasound, only becomes possible at all. The repetition of the measurement, in this instance, is also able to make possible the detection of moved objects in the environment.

It is advantageous that the transmitter includes one or more ultrasonic sensors, which emit acoustic waves and that the transmitter includes one or more antennas, which emit electromagnetic waves, the waves being detected by one or more receivers as received signals. Because of that, the accuracy of the object hypothesis formation is able to be increased. The transmitter may also include one or more antennas, which emit electromagnetic waves. The use of ultrasonic sensors is advantageous up to a distance of 10 m, in this context. At more than 10 m, electromagnetic waves may be advantageous, ultrasonic sensors and antennas combined being used. In addition, it may be imagined that a plurality of transmitting frequencies are sequentially passed through, which is also possible using a transmitter. Since there is a frequency sensitivity of the interaction of an ultrasonic wave with the environmental objects, the accuracy for the object hypothesis formation may accordingly also be achieved by additional transmitting frequencies. Also, in the case of a plurality of ultrasonic sensors, these may emit their transmitting pulses offset in time, so that the reflections become superposed, the superposition of the reflections leading to additional data on the objects in the environment. The mixed use of transmitting pulses offset in time in various frequency ranges is thus also conceivable. In addition, by a spatial separation of the individual receivers from the transmitters, the runtime behavior of the reflected waves may be investigated more accurately.

Furthermore, the objective of the present invention is also attained by a device for the detection of objects using at least one transmitting pulse as a wave, particularly as an acoustic or an electromagnetic wave, being emittable by one transmitter, which is reflected at least partially by objects in the propagation space; the reflected wave being detectable by at least one receiver as a received signal. According to the present invention it is provided that the received signal of the reflected wave be divided up into segments over time, and from the individual segments, data being obtainable that are drawn upon for the determination of an object hypothesis.

It is particularly advantageous that the device has a transmitter array, transmitting pulses being emittable at simultaneous time intervals or at offset time intervals. With that, use of the device, in a motor-vehicle, for example, is also possible, and because of the use of a plurality of transmitters on the motor vehicle's outer skin, an accurate emission of pulses is made possible into the environment that is to be observed. It is also conceivable that a receiver array is used which is able to receive the reflected pulses. In addition, in the case of ultrasound, the use of an array element may be possible as transmitter and receiver.

DETAILED DESCRIPTION OF THE INVENTION

Figure 1:
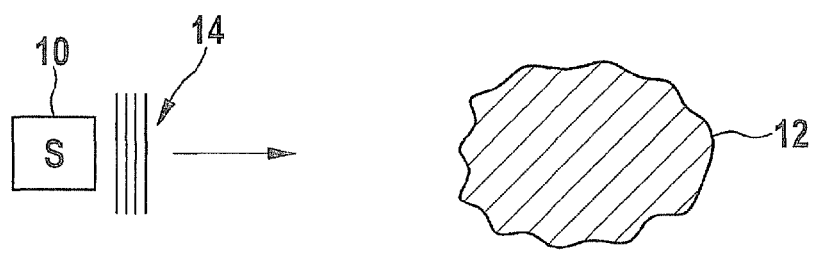
FIG. 1 shows a schematic view of a transmitter which emits a transmitting pulse.

FIG. 1 schematically shows a transmitter 10, for instance, for ultrasonic waves or electromagnetic waves, which emits a transmitting pulse 14 into a propagation space, in which there is an object 12. Transmitting pulse 14 may vary in its intensity, so that various amplitudes are able to be used. In addition, it is possible to emit various transmitting pulse lengths. Furthermore, the use of several transmitters 10 is conceivable, which emit transmitting pulses that are simultaneous or offset in time. A variation in the frequencies at which the transmitting pulses are emitted is also possible. In this context, setting up transmitters 10 is independent from a specified geographic position or of the corresponding receivers.

Figure 2:
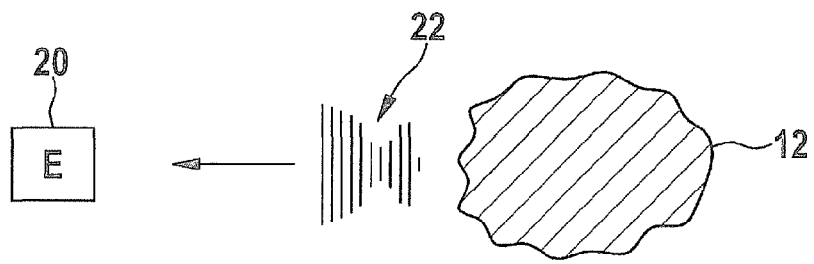
FIG. 2 shows a schematic view of a transmitter which receives a transmitting pulse reflected by an object.

In FIG. 2, a receiver 20 is shown, for example, which is used for measuring reflection signals. An object 12, which is hit by a transmitting pulse 14, causes a reflected wave 22 which is radiated back into the propagation space. Receiver 20 is in a position, in this instance, to convert the reflected wave to electrical signals in the form of a received signal, so that additional electrotechnical and/or electronic processing is possible. In this process, a piezo element may be used in receiver 20. A plurality of receivers 20 is also conceivable, which are able to be used geographically independently of one another, so that a more accurate investigation of reflected wave 22 is made possible. For this, the running time behavior of reflected wave 22 may be investigated in more detail. This makes it easier to ascertain patterns of motion of moved objects between receiver 20 and object 12.

Figure 3:
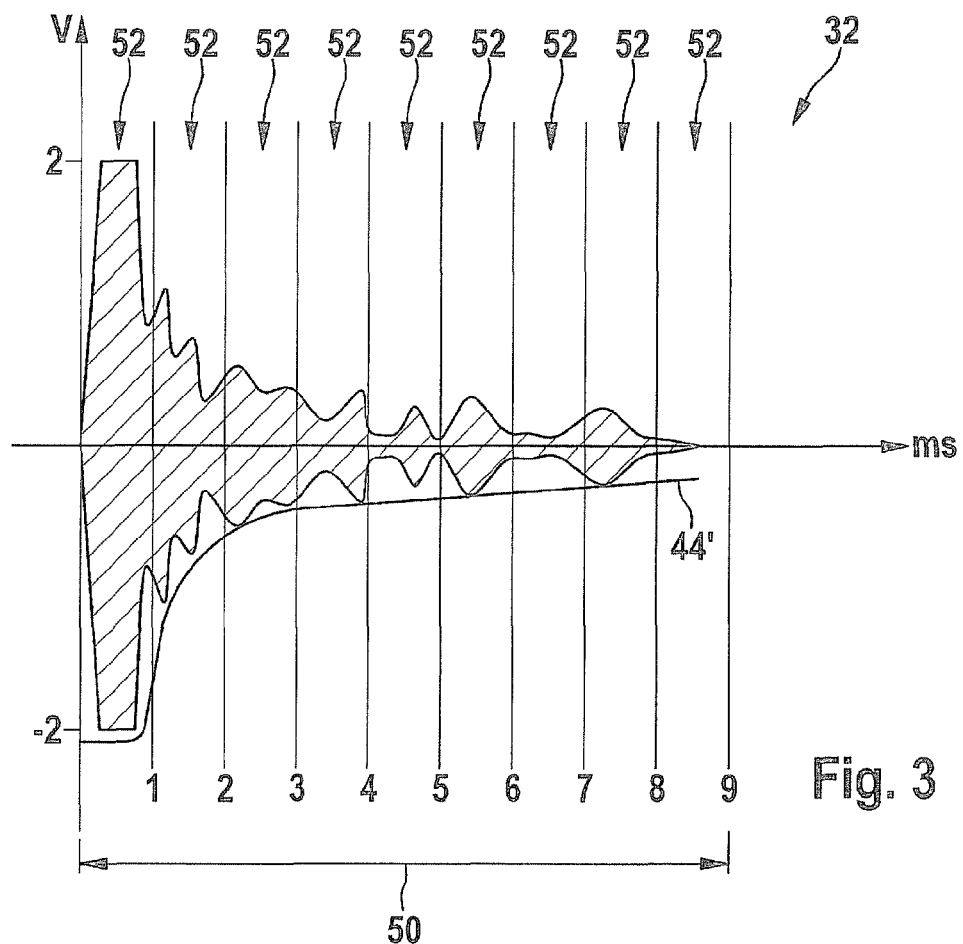
FIG. 3 shows a diagram in which a received signal of a reflected wave is shown.

In FIG. 3, received signal 32 of a reflected wave 22 is shown in a diagram. This received signal 32 is segmented by the method according to the present invention, the individual segments 52 being investigated. For this purpose, for individual segments 52, which are segmented into equal time intervals, the data on half-height width 42 and also on pulse height 40 or envelope 44' are ascertained. In addition to these data of individual segments 52, the postoscillation behavior of the received signal of reflected wave 22 and/or of envelope 44' of received signal 32 of reflected wave 22 gives additional information on the object nature.

Figure 4:
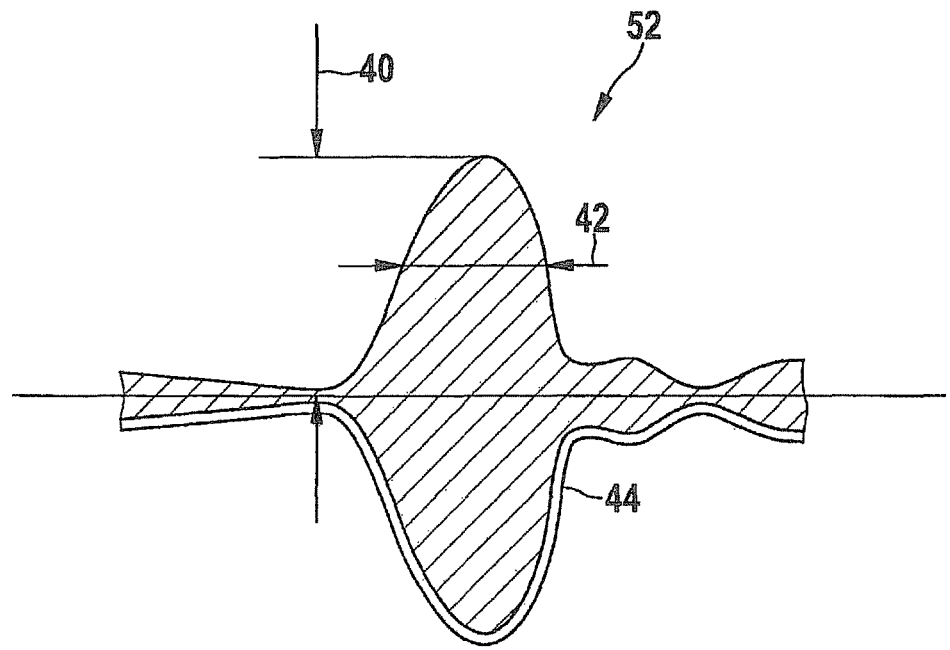
FIG. 4 shows a diagram in which an individual segment over time is shown.

FIG. 4 shows the form of a segment 52 over time. In this context, it is possible to characterize segments 52 via a selection of clear-cut features. Among these are pulse height 40, half-width height 42 and/or an envelope 44. In this context, individual segments 52 are able to give direct information on the geometry and the surface condition of an object 12, or in relation to one another. In addition, data over time on the decay behavior are also possible for being drawn upon for the determination of object 12. These data indirectly reflect the interaction of transmitting pulses 14 with the objects, and they may be used for characterizing objects 12. A smooth surface, for instance, leads to little scattering data, so that received signal 32 is able to be perceived only when the surface normal of object 12 is orthogonal to receiver 20. Edges, corners, roundings and roughnesses generally increase the scattering proportion/diffraction proportion, which becomes noticeable in an increase in half-height width 42. Such data on individual segments 52 are used for the phenomenological classification of objects 12.

Figure 5:
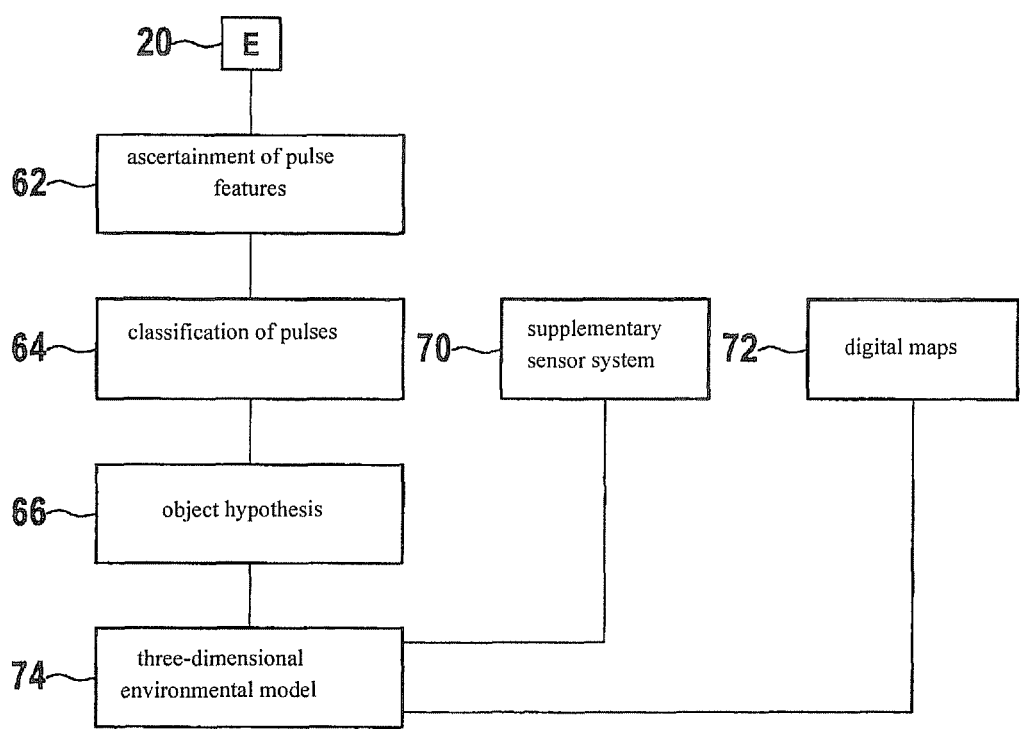
FIG. 5 shows a flow chart illustrating the method according to the present invention.

FIG. 5 shows a flow chart for setting up an initial three-dimensional environmental model. From a wave 22 detected by a receiver 20 there takes place first of all the ascertainment of pulse features 62 from individual segments 52, such as pulse height 40 and/or half-height width 42 and/or envelope 44. These are then drawn upon for the classification of pulses 64. The classification of pulses 64 takes place by picking up training signals, with the aid of which an adaptive system in the form of a parametric or nonparametric classification method, such as a neural network or a data bank for classification is designed. For picking up training signals, in this context, various forms of object 12 may be used, such as smooth or rough walls, guardrails, roadway posts, curbstones, parking space boundaries and the like. For these objects 12, based on the pulse features, classificators are trained which may be stored, for instance, in a control unit of a motor vehicle, and be drawn upon for the evaluation in the signal analysis. In this way, one obtains object hypotheses 66, which will be drawn upon for the formation of a three-dimensional environmental model. In order to obtain a more accurate three-dimensional environmental model, in addition to the object hypotheses, a supplementary sensor system 70 may be used, so that by additional signals, such as video signals and/or data of a laser scanner used, the formation of a more accurate three-dimensional environmental model 74 is made possible. In addition, data from digital maps 72 may be used to form a three-dimensional environmental model 74. In order to obtain an even more accurate three-dimensional environmental model 74, a comparison is made of the computed to the ascertained received signal, and a deviation is calculated of the simulated signal from reality. As long as a specified tolerance threshold is exceeded, one may assume that three-dimensional environmental model 74 does not yet sufficiently accurately reflect reality. Accordingly, directed adaptations of three-dimensional environmental model 74 are carried out, and the steps described before may be run through until a specified breaking-off condition is satisfied. With that, the three-dimensional environmental model 74 obtained may be passed on to a post-connected driver assistance function. The detection of dynamic objects 12 may accordingly take place effectively. Thus, using the precedence of vehicle positioning and sensor positioning 20 and data on static three-dimensional objects 12, the received signals to be expected may be precalculated from digital maps 72. Strong deviations should, in first place, be attributed to dynamic objects 12, whose classification is made possible more rapidly by the delimitation of the hypothesis space described, and particularly for ultrasound. It is possible to use the method according to the present invention and the device according to the present invention in motor vehicles.

What is claimed is:

1. A method for detecting an object, comprising:
    emitting, by at least one transmitter, a pulse as one of an acoustic wave or an electromagnetic wave, wherein said pulse is at least partially reflected by the object in the propagation space;
    detecting, by at least one receiver, the reflected wave as a received signal;
    dividing the received signal of the reflected wave into segments;
    obtaining data from the segments of the received signal;
    generating an object hypothesis from the data obtained from the segments of the received signal;
    wherein the object hypothesis is generated using at least one of a model-based iterative approach, a support vector machine, and a Gaussian process.

2. The method as recited in claim 1, wherein the received signal is divided into segments over time.

3. The method as recited in claim 2, wherein a curve adjustment takes place for an envelope of the amplitude of the segments.

4. The method as recited in claim 2, wherein data are ascertained on the decay behavior of the received signal.

5. The method as recited in claim 2, wherein a pulse feature including at least one of a half-height width and an actual pulse height of the received signal is determined from the segments of the received signal.

6. The method as recited in claim 5, wherein the object hypothesis includes information regarding at least one of a type of the object and a surface property of the object.

7. A method for detecting an object, comprising:
emitting, by at least one transmitter, a pulse as one of an acoustic wave or an electromagnetic wave, wherein said pulse is at least partially reflected by the object in the propagation space;
detecting, by at least one receiver, the reflected wave as a received signal;
dividing the received signal of the reflected wave into segments over time;
obtaining data from the segments of the received signal;
generating an object hypothesis from the data obtained from the segments of the received signal;
obtaining at least one of additional signals and digital map data by using a supplementary sensor system including at least one of a video scanner and a laser scanner; and
generating a three-dimensional environmental model using the at least one of additional signals and digital map data.

8. The method as recited in claim 7, further comprising:
calculating a deviation of the object hypothesis from the three-dimensional environmental model.

9. The method as recited in claim 8, wherein the transmitter includes at least one of:
at least one ultrasonic sensor which emits acoustic waves; and
at least one antenna which emits electromagnetic waves.

10. A device for detecting an object, comprising:
at least one transmitter emitting a pulse as one of an acoustic wave or an electromagnetic wave, wherein said pulse is at least partially reflected by the object in the propagation space;
at least one receiver detecting the reflected wave as a received signal;
means for dividing the received signal of the reflected wave into segments over time;
means for obtaining data from the segments of the received signal;
means for generating an object hypothesis from the data obtained from the segments of the received signal;
wherein the object hypothesis is generated using at least one of a model-based iterative approach, a support vector machine, and a Gaussian process.

11. The device as recited in claim 10, wherein multiple transmitters are provided as a transmitter array for emitting multiple pulses at one of synchronized time intervals or at offset time intervals.

12. The method as recited in claim 1, wherein the object hypothesis is generated using a model-based iterative approach.

13. The method as recited in claim 1, wherein the object hypothesis is generated using a support vector machine.

14. The method as recited in claim 1, wherein the object hypothesis is generated using a Gaussian process.

15. The device as recited in claim 10, wherein the object hypothesis is generated using a model-based iterative approach.

16. The device as recited in claim 10, wherein the object hypothesis is generated using a support vector machine.

17. The device as recited in claim 10, wherein the object hypothesis is generated using a Gaussian process.

* * * * *